(12) United States Patent
Aiello et al.

(10) Patent No.: US 7,284,909 B2
(45) Date of Patent: *Oct. 23, 2007

(54) HYBRID ORBITAL FLUID DYNAMIC BEARING MOTOR

(75) Inventors: Anthony J. Aiello, Santa Cruz, CA (US); Hans Leuthold, Santa Cruz, CA (US); Klaus D. Kloeppel, Watsonville, CA (US); Paco Flores, Felton, CA (US); Alan L. Grantz, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/021,702

(22) Filed: Dec. 23, 2004

(65) Prior Publication Data

US 2006/0140520 A1    Jun. 29, 2006

(51) Int. Cl.
*F16C 17/10* (2006.01)

(52) U.S. Cl. ..................... 384/112; 384/901
(58) Field of Classification Search ............ 384/901, 384/114, 107, 112, 115
See application file for complete search history.

(56) References Cited

U.S. PATENT DOCUMENTS

| 5,223,758 A | 6/1993 | Kataoka et al. |
| 6,154,339 A | 11/2000 | Grantz et al. |
| 7,073,944 B2 * | 7/2006 | Aiello et al. ............ 384/107 |

OTHER PUBLICATIONS

U.S. Appl. No. 10/676,672, filed Jul. 11, 2006, Aiello et al.

* cited by examiner

*Primary Examiner*—Lenard A. Footland
(74) *Attorney, Agent, or Firm*—Stephen C. Durant; Novak Druce & Quigg LLP

(57) ABSTRACT

Hybrid orbital fluid dynamic bearing motors are disclosed. The motors achieve improved efficiency advantages observed in fluid dynamic bearing motors containing an orbital ring. In addition, the hybrid orbital FDB motor has serial thrust bearings and traditional style journal bearings, which provide typically higher radial and angular stiffness not observed in previous orbital fluid dynamic bearing motor designs. Designs for centering orbital rings are also disclosed.

11 Claims, 11 Drawing Sheets

HYBRID ORBITAL FLUID DYNAMIC BEARING MOTOR

BACKGROUND

1. Field of the Invention

This invention relates generally to fluid dynamic bearings and more specifically to a fluid dynamic bearing assembly configured with an orbital ring that rotates at a fractional speed, thereby increasing the overall stiffness-to-power ratio of the assembly.

2. Description of the Background Art

Fluid dynamic bearings tend to generate less vibration and non-repetitive run-out in the rotating parts of motors than ball bearings and other types of bearings. For this reason, fluid dynamic bearing motors are oftentimes used in precision-oriented electronic devices to achieve better performance. For example, using a fluid dynamic bearing motor in a magnetic disc drive result in more precise alignment between the tracks of the discs and the read/write heads. More precise alignment, in turn, allows discs to be designed with greater track densities, thereby allowing smaller discs and/or increasing the storage capacity of the discs.

An ongoing challenge in fluid dynamic bearing motor design is balancing the tradeoff between motor performance and power consumption. On the one hand, increasing the stiffness of the fluid dynamic bearings results in less vibration in the motor's rotating parts and, therefore, increased motor precision and performance. On the other hand, however, increasing bearing stiffness results in greater power consumption because of increased viscous losses in the bearings. Conversely, decreasing the power consumption of the fluid dynamic bearings typically requires a substantial decrease in bearing stiffness and, hence, decreased motor performance.

In the field of fluid dynamic bearing motors for use in hard disc drives, bearing designs utilizing an orbital ring on which sets of journal and thrust bearings act in series produce higher stiffness efficiency and higher damping. Such fluid dynamic bearing motors have a number of disadvantages, however, including lower stiffness due to the bearing stiffness acting in series, and up to twice as many precision surfaces to machine and groove.

SUMMARY

A hybrid orbital fluid dynamic bearing motor assembly is provided. The assembly includes an inner member, an outer member configured to rotate about a rotational axis at a first angular velocity, and an orbital ring disposed between the inner member and the outer member. The orbital ring is configured to rotate about the rotational axis at a second angular velocity that is less than the first angular velocity. A first fluid dynamic thrust bearing is disposed between the orbital ring and the inner member. A second fluid dynamic thrust bearing is disposed between the orbital ring and the second member. At least one fluid dynamic journal bearing disposed between the inner member and the outer member. The thrust bearings act in parallel with the journal bearing to form a hybrid orbital fluid dynamic bearing motor.

In another aspect, a hybrid orbital fluid dynamic bearing motor assembly is provided that includes an inner member, an outer member configured to rotate about a rotational axis at a first angular velocity, and an orbital ring disposed between the inner member and the outer member. The orbital ring is configured to rotate about the rotational axis at a second angular velocity that is less than the first angular velocity. The hybrid orbital fluid dynamic bearing motor also includes a first set of bearing surfaces having a conical shape relative to the central axis of the assembly, and a journal bearing disposed between the inner member and the outer member to form a hybrid orbital fluid dynamic bearing motor.

In another aspect, an orbital fluid dynamic bearing motor assembly is provided that includes an inner member, an outer member configured to rotate about a rotational axis at a first angular velocity, and an orbital ring disposed between the inner member and the outer member. The orbital ring is configured to rotate about the rotational axis at a second angular velocity that is less than the first angular velocity. The orbital ring is further configured in conjunction with the inner member and outer member to realign around the rotational axis of the assembly.

BRIEF DESCRIPTION OF THE DRAWINGS

FIG. 14 depicts a partial cross-section of a fluid dynamic bearing motor, according to another embodiment.

DETAILED DESCRIPTION

In one aspect, the present application is directed to a hybrid orbital fluid dynamic bearing (FDB) motor. The hybrid orbital FDB motor achieves high stiffness and efficiency by placing an orbital ring with fluid dynamic thrust bearings on its top and bottom sides between the rotating and stationary parts of the motor. The orbital ring axially supports the hub's rotation, and rotates at some fraction of the motor speed. Since the ring orbits freely between the stationary and rotating parts, the speed of the orbital ring relative to that of the rotating hub can be adjusted to within a range centered roughly on the rotor's half-speed. Because bearing drag power is proportional to speed squared, each of the thrust bearings will require roughly one-fourth of the power they would have required at full rotor speed. This efficiency advantage allows larger bearings to be used for better stiffness properties or it can enable a very low power thrust bearing design. Since the thrust bearings are typically significantly larger in diameter than the journal bearings and have correspondingly lower efficiency, this reduction of thrust power is a substantial advantage.

In addition, the motor provided herein is a hybrid between motors having serial thrust bearings and traditional style journal bearings. Specifically, the serial thrust bearings are used in parallel with traditional style journal bearings (not serial) which provide typically higher radial and angular stiffness. The thrust gaps are maintained by preloading with a magnetic bias force (typically achieved by axially offsetting the stator and rotor and/or magnet attraction to a steel ring/base).

Figure 1A:
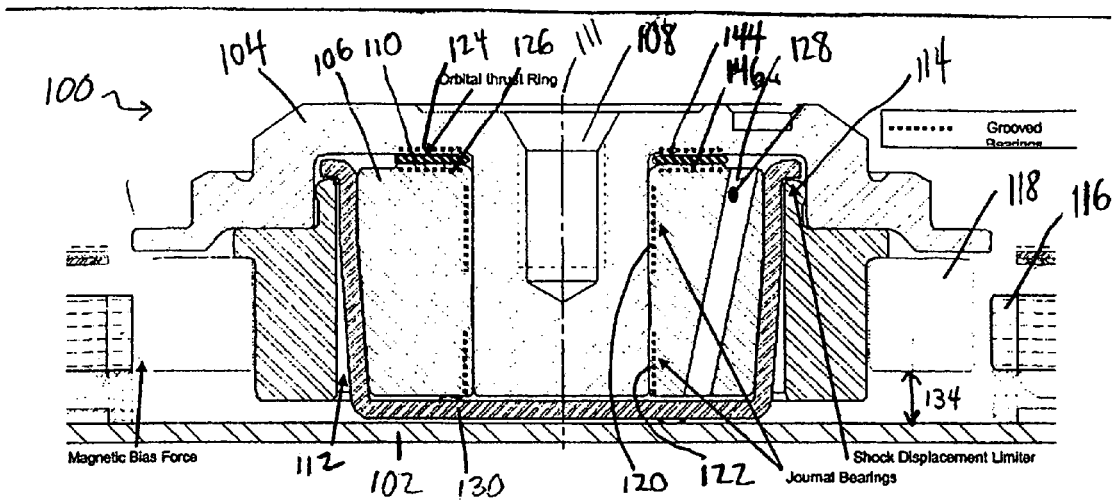
FIG. 1A depicts a cross-section of a hybrid orbital fluid dynamic bearing motor according to one embodiment.

With reference to FIG. 1A, in one embodiment, a cross-sectional view of a rotating shaft motor design is described. The rotating shaft motor design includes an orbital thrust ring located between the hub and sleeve to provide axial support relative to the hub. Orbital ring spins at a fraction of the motor speed, thereby substantially reducing the thrust bearing component of overall viscous losses. The upper and lower journal bearings are equal in diameter and act in parallel with each other, while the upper and lower thrust bearings act in series with each other.

According to one embodiment, FIG. 1A is a cross-sectional view illustrating a thin serial thrust bearing orbital ring 110 configured between a stationary sleeve 106 and rotating hub 104 of hybrid orbital FDB motor assembly 100. As shown, hybrid orbital FDB motor assembly 100 may include, without limitation, a base 102, a hub 104, a sleeve 106, an orbital ring 110, a seal 112, a shock displacement limiter 114, a stator assembly 116, a magnet 118, and an encapsulating cup 130.

Sleeve 106 is attached to encapsulating cup 130 and supports hybrid orbital FDB motor assembly 100. As configured, sleeve 106 is stationary, and hub 104 rotates. Hub 104 is attached to or integral with shaft 108, and is configured to rotate about a rotational axis 111. Magnet 118 cooperates with stator assembly 116 to drive rotation. Specifically, magnet 118 is attached to hub 104, and the electromagnetic interaction between magnet 118 and stator assembly 116 causes hub 104 to rotate. Sleeve 106 is further configured to include a recirculation channel 128.

Shaft 108 is attached to hub 104. In one embodiment, shaft 108 is attached to or integral with hub 104 by an interference fit or adhesive bond. As shaft 108 is attached to or integral with hub 104, shaft 108 rotates about rotational axis 111 as well.

Orbital ring 110 is disposed between sleeve 106 and hub 104. Orbital ring 110 is configured to rotate about rotational axis 111 at an angular velocity that is less than the angular velocity of hub 104 as previously described herein. Specifically, bearing gap 144 is between the top axial surface of orbital ring 110 and the facing surface of hub 104, and bearing gap 146 is between the bottom axial surface of orbital ring 110 and the facing surface of sleeve 106. As hub 104 rotates about rotational axis 111, the bearing fluid in bearing gap 144 exerts sheer forces on the top axial surfaces of orbital ring 110. The torques resulting from this sheer force causes orbital ring 110 to rotate about rotational axis 111 in the same direction as hub 104. In addition, the bearing fluid in bearing gap 146 exerts sheer forces on the bottom axial surfaces of orbital ring 110. Because sleeve 106 is stationary, the torques resulting from these sheer forces resist the rotation of orbital ring 110 about rotational axis 111 caused by the rotation of hub 104. Orbital ring 110 reaches a steady-state angular velocity about rotational axis 111 (in the same direction as hub 104) when the torques acting on the top and bottom axial surfaces of orbital ring 110 are in balance with one another.

The power consumed by a fluid dynamic bearing is a function of, among other things, the square of the relative velocity between its two bearing surfaces. Because the motion of orbital ring 110 relative to hub 104 and sleeve 106 effectively decreases the relative velocity between the bearing surfaces of fluid dynamic thrust bearings 124 and 126, orbital ring 110 substantially decreases the power consumption of hybrid orbital FDB motor assembly 100. For example, in one embodiment, FDB motor assembly 100 is configured such that the angular velocity of orbital ring 110 is approximately half that of hub 104. As sleeve 106 is stationary, the difference in the velocities of the bearing surfaces of fluid dynamic thrust bearings 124 and 126 is approximately one half of the angular velocity of hub 104. By contrast, if orbital ring 110 is not included in hybrid orbital FDB motor assembly 100, and assuming that hybrid orbital FDB motor assembly 100 therefore includes only one fluid dynamic journal bearing and one fluid dynamic thrust bearing, then the difference in the velocities of the bearing surfaces of the fluid dynamic bearings is simply the angular velocity of hub 104. Because including orbital ring 110 reduces the difference in bearing surface velocities by one half, each of fluid dynamic thrust bearings 124 and 126 consumes approximately one fourth the power that each of the fluid dynamic bearings consumes if orbital ring 110 is not included in hybrid orbital FDB motor assembly 100. Hybrid orbital FDB motor assembly 100 with orbital ring 110 therefore consumes substantially less power than hybrid orbital FDB Motor assembly 100 without orbital ring 110 consumes.

As FIG. 1A also shows, hybrid orbital FDB motor assembly 100 includes fluid dynamic journal bearings 120 and 122 and fluid dynamic thrust bearings 124 and 126. Fluid dynamic journal bearings 120 and 122 are in parallel with each other, and are disposed between sleeve 106 and shaft 108. The serial fluid dynamic thrust bearings 124 and 126 as a group in parallel with traditional style parallel journal bearings 120 and 122 define a hybrid orbital FDB motor design. The hybrid orbital FDB motor design retains the significantly reduced power performance of motors having an orbital ring, allowing larger bearings to be used with better stiffness performance, or enabling a very low power thrust bearing design. The addition of parallel journal bearings provides higher radial and angular stiffness.

Each of fluid dynamic journal bearings 120 and 124 and fluid dynamic thrust bearings 124 and 126 includes at least one bearing surface having a grooved bearing pattern. These grooved bearing surfaces may include any suitable type of grooved bearing pattern, including, without limitation, a pattern of outward spiral grooves, inward spiral grooves, or a pattern of chevron grooves as known in the art. Further, as persons skilled in the art will recognize, any of hub 104, orbital ring 110, or sleeve 106 may include one or more bearing surfaces having a grooved bearing pattern. Persons skilled in the art also will understand that a fluid dynamic bearing may include one or more sets of grooves.

In alternative embodiments, each of fluid dynamic journal bearings 120 and 122 and fluid dynamic thrust bearings 124 and 126 may have any configuration and may pump bearing fluid in any direction so long as orbital ring 110 functions as intended. Persons skilled in the art therefore will recognize that neither the configurations nor the locations of fluid dynamic journal bearings 120 and 122 or fluid dynamic thrust bearings 124 and 126 in any way limits the function of the hybrid orbital FDB motor, provided that serial thrust bearings 124 and 126 remain in parallel with the parallel journal bearings 120 and 122.

Orbital ring 110 has a narrow gap between its inner diameter and hub 104. Orbital ring 110 is thin. The narrow gap between orbital ring 110 and 104 prevents off-axis drift of orbital ring 110, effectively centering orbital ring 110.

Figure 1B:
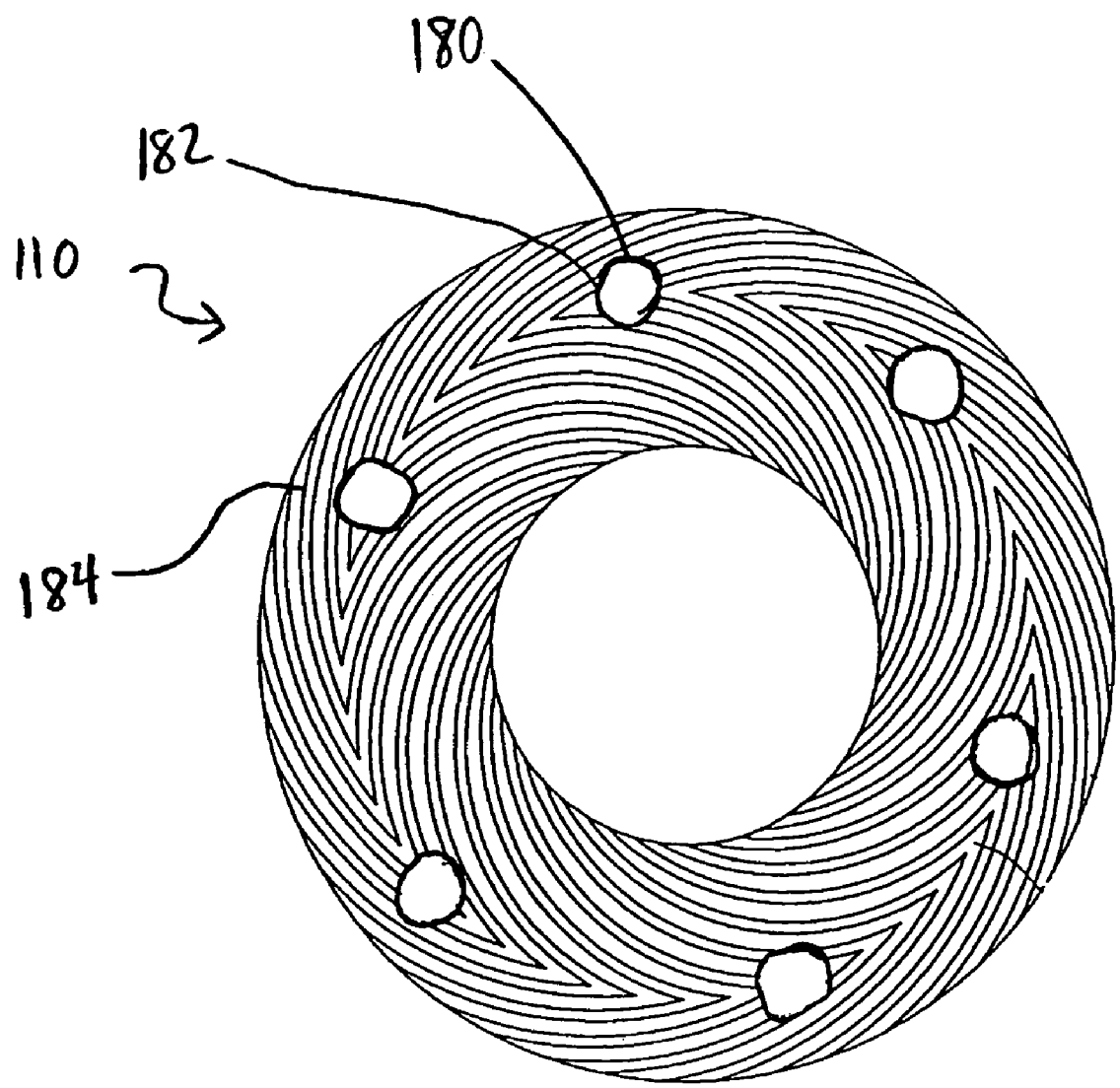
FIG. 1B depicts a top view of an orbital ring, according to one embodiment.
Figure 1C:
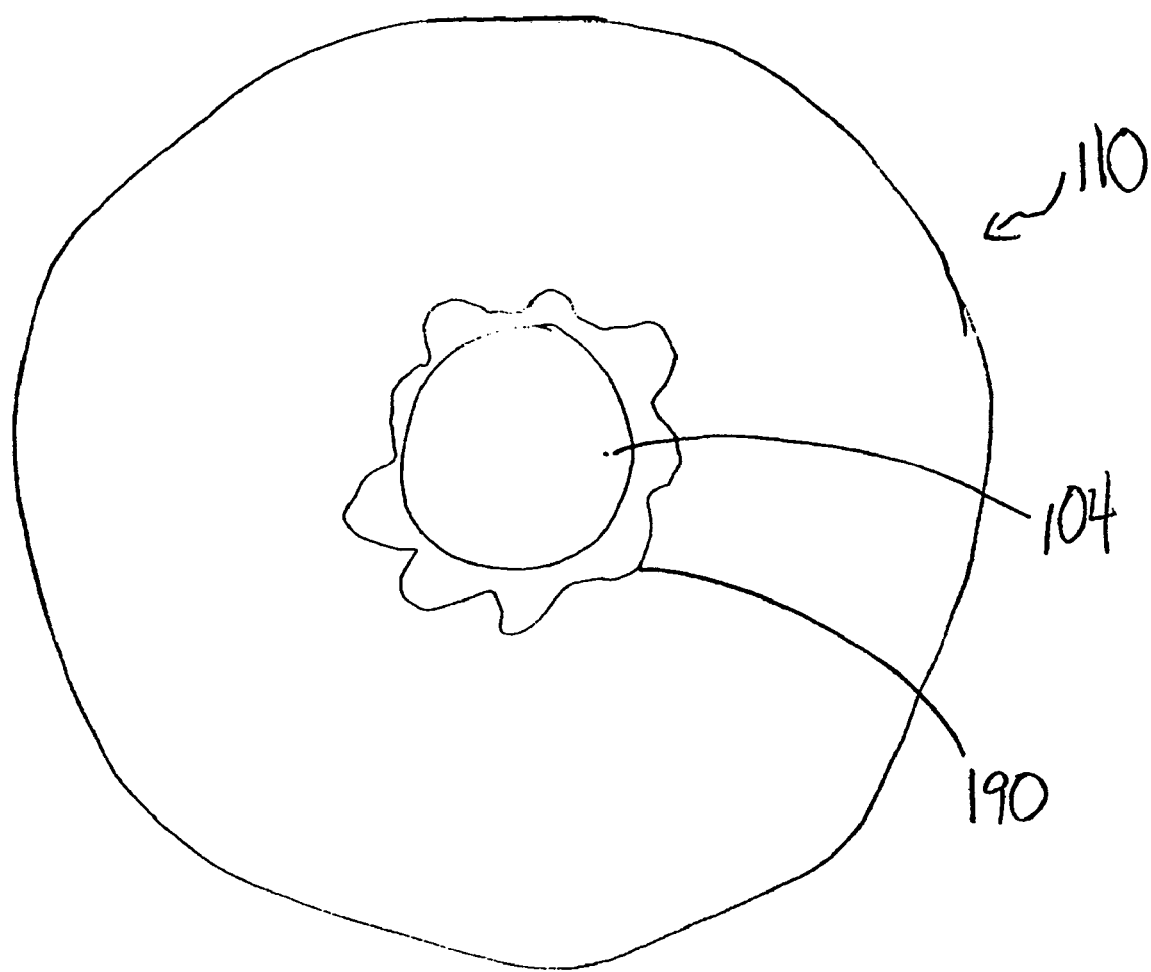
FIG. 1C depicts a top view of an orbital ring, according to another embodiment.

In another embodiment, with reference to FIG. 1C, inner diameter of orbital ring 110 has a wave-like configuration 190. Orbital ring 110 has small clearance between the inner diameter of orbital ring 110 and hub 104. The wavelike configuration 190 provides hydrodynamic centering of orbital ring 110 around hub 104.

Recirculation channel 128 accommodates bearing fluid flow induced by fluid dynamic journal bearings 120 and 122 and fluid dynamic thrust bearings 124 and 126 and enforces favorable pressure boundary conditions between fluid dynamic bearing regions. As configured, the pressure within and at each end of recirculation channel 128 remains at approximately ambient pressure. As a general matter, however, recirculation channel 128 may be configured in any way that creates the desired bearing fluid flow about orbital ring 110 and the desired boundary conditions between fluid dynamic bearing regions. Persons skilled in the art will therefore recognize that the configuration of recirculation channel 128 in no way limits the scope of the present embodiment.

In addition, hybrid orbital FDB motor assembly 100 also may be configured such that a downward-acting preloading force is exerted on hub 104. In one embodiment, magnet 118 and stator assembly 116 are disposed such that an offset separates the center of magnet 118 and the center of stator assembly 116. The axial electromagnetic force generated between magnet 118 and stator assembly 116 acts to axially align the centers of each assembly. The result is that an axially downward net force is exerted on magnet 118 (and therefore hub 104) that attempts to realign the centers of magnet 118 and stator assembly 116. The magnitude of this preloading force is a function of, among other things, the size of offset between the centers of the magnet 118 and the stator 118. In an alternative embodiment, base 132 and magnet 118 may be separated by a gap 134. Base 132 also may include a magnetic metal such as a Series 400 steel or a low carbon steel. In such a configuration, an axially downward magnetic force results that pulls magnet 118 (and therefore hub 104) towards base 102. The magnitude of this preloading force is a function of, among other things, the size of gap 134. In other alternative embodiments, the preloading force may be created in any other feasible way.

With further reference to FIG. 1B, orbital ring 110 is designed to have channels 180 that interact with chevron groove flow. The channels may be holes placed in orbital ring 110. The channels 180 are aligned with the apex 182 of chevron grooves 184. As orbital ring 110 spins around central axis 111, fluid is pumped by chevron grooves through channels 180. Because the apex 182 of the chevron grooves 184 are aligned with the channels 180, orbital ring 110 insures that the ring rotates and the bearing gaps are established at the beginning of operation.

As persons skilled in the art will recognize, the downward-acting preloading force tends to close bearing gaps 144 and 146. As hub 104 and orbital ring 110 reach their angular velocities during operation, the high pressure regions in the bearing fluid generated locally to fluid dynamic thrust bearings 124 and 126 tend to open bearing gaps 144 and 146. The size of each of bearing gaps 144 and 146 therefore is a function of, among other things, the angular velocities of hub 104 and orbital ring 110, the configurations of fluid dynamic thrust bearings 124 and 126, the bearing fluid pressure, and the magnitude of the downward-acting preloading force.

The following describes several other embodiments of the invention. Persons skilled in the art will understand that the same general principles set forth above apply to each of these other embodiments. For this reason, the following descriptions focus primarily on the differences between each of these other embodiments and the embodiment described above in conjunction with FIG. 1A.

Figure 2:
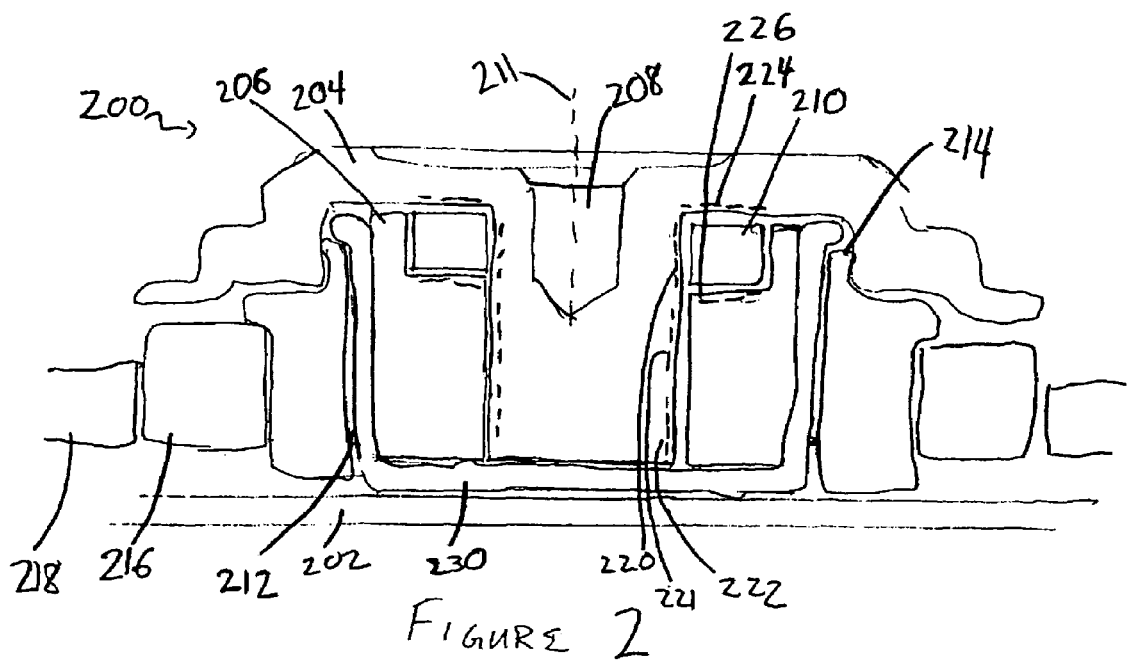
FIG. 2 depicts a cross-section of a hybrid orbital fluid dynamic bearing motor according to another embodiment.

FIG. 2 is a cross-sectional view illustrating an orbital ring 210 in a fluid dynamic bearing motor assembly 200. As shown, FDB motor assembly 200 may include, without limitation, a base 202, a hub 204, a sleeve 206, an orbital ring 210, a seal 212, a shock displacement limiter 214, a stator assembly 216, a magnet 218, and an encapsulating cup 230.

In another embodiment, FIG. 2 illustrates a cross-sectional view illustrating a stator assembly 210 in a fluid bearing motor assembly 200. The rotating shaft motor design includes orbital thrust ring 210 located between hub 204 and sleeve 206 to provide axial support relative to hub 204. Orbital ring 210 spins at a fraction of the motor speed, thereby substantially reducing the thrust bearing component of overall viscous losses. The upper and lower journal bearings are equal in diameter and act in parallel, while the upper and lower thrust bearings act in series. The embodiment of FIG. 2 is thus a hybrid orbital FDB motor.

Sleeve 206 is attached to cup 230 base 202 and supports hybrid orbital FDB motor assembly 200. As configured, sleeve 206 is stationary. Hub 204 is configured to rotate about a rotational axis 211. Specifically, magnet 218 is attached to hub 204, and the electromagnetic interaction between magnet 218 and stator assembly 216 causes hub 204 to rotate. Shaft 208 is attached to hub 204. In one embodiment, shaft 208 is attached to or integral with hub 204 by an interference fit or adhesive bond. Both shaft 208 and hub 204 rotate about rotational axis 211 as well.

Orbital ring 210 has a larger thickness than orbital ring 110 depicted in FIG. 1A. Orbital ring 210 is bounded by shaft 208, hub 204, and on two sides by sleeve 206. The inner diameter of orbital ring 210 includes fluid dynamic journal bearing 220 that centers orbital ring 210 with respect to shaft 208. Traditional journal bearings 221 and 222 are disposed between sleeve 206 and shaft 208. Journal bearings 221 and 222 are arranged in parallel with bearing 220 to provide for centering of orbital ring 210. Optionally, a single journal bearing can be substituted for journal bearings 221 and 222.

Fluid dynamic thrust bearings 224 and 226 are arranged in series. Fluid dynamic thrust bearing 224 is disposed between hub 204 and orbital ring 210. Fluid dynamic thrust bearing 226 is disposed between sleeve 206 and orbital ring 210. Serial fluid dynamic thrust bearings 224 and 226 act in parallel with traditional style fluid dynamic journal bearings 221 and 222 and fluid dynamic journal bearing 220.

The embodiment depicted by FIG. 2 is a hybrid orbital FDB motor. Like other embodiments disclosed herein, the hybrid orbital FDB motor design retains the significantly reduced power performance of motors having an orbital ring, allowing larger bearings to be used with better stiffness performance, or enabling a very low power thrust bearing design. The addition of parallel journal bearings provides higher radial and angular stiffness than in previous orbital ring designs.

Each grooved bearing surfaces may include any suitable type of grooved bearing pattern, including, without limitation, a pattern of spiral grooves or a pattern of chevron grooves. Further, as persons skilled in the art will recognize, any of orbital ring 210, sleeve 206, or hub 204 may include one or more bearing surfaces having a grooved bearing pattern. Persons skilled in the art also will understand that a fluid dynamic bearing may include one or more sets of grooves.

Each of the fluid dynamic thrust bearings 224 and 226 and fluid dynamic journal bearings 221 and 222, and journal bearing 222 may have any configuration and may pump bearing fluid in any direction so long as orbital ring 210 functions as intended. Further, each such bearing may be disposed in any suitable location. Persons skilled in the art therefore will recognize that neither the configurations nor the locations of fluid dynamic journal bearings 220 and 222 or fluid dynamic thrust bearings 224 and 226 in any way limit the scope of the invention.

Persons skilled in the art will understand that the same general principles and concepts described above in conjunction with FIG. 1A apply with equal force to the embodiment described above in conjunction with FIG. 2.

Figure 3:
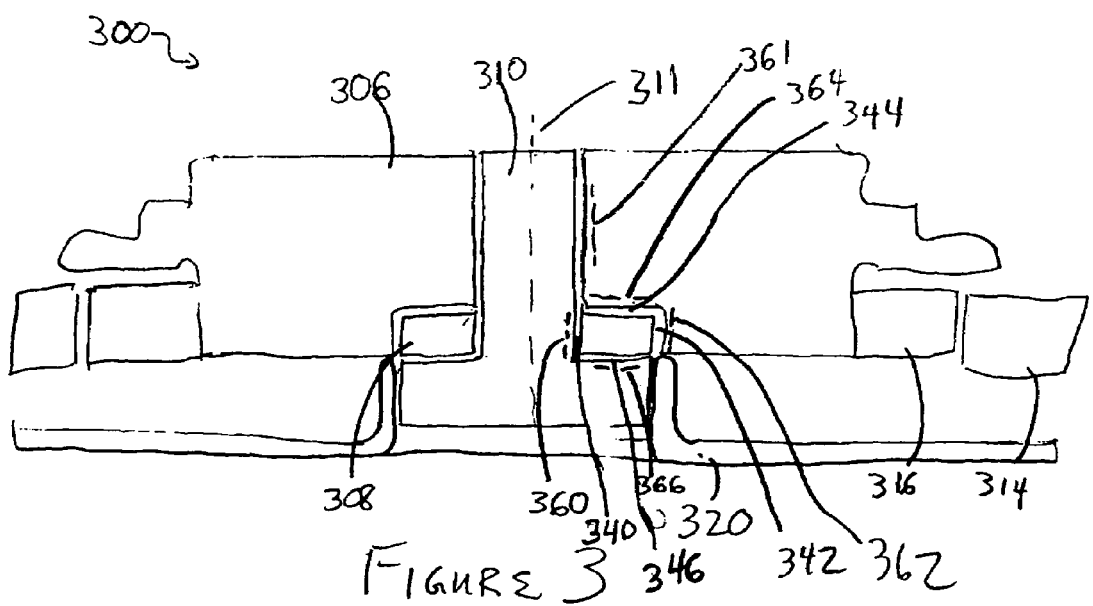
FIG. 3 depicts a cross-section of a hybrid orbital fluid dynamic bearing motor according to another embodiment.

In another embodiment, FIG. 3 depicts a cross-sectional simplified view of another embodiment of a hybrid orbital FDB motor assembly. The embodiment depicted in FIG. 3 is stationary shaft design. Hybrid orbital FDB motor assembly 300 may include, without limitation, a hub 306, orbital ring 308, a shaft 310, a stator assembly 314, a magnet 316, and base 320. Shaft 310 is attached to base 320 and supports hybrid orbital FDB motor assembly 300. Magnet 316 is attached to hub 306, and the electromagnetic interaction between magnet 316 and stator assembly 314 causes hub 306 to rotate about rotational axis 311.

Orbital ring 308 is disposed between hub 306 and shaft 310 and is configured to rotate about rotational axis 311. Orbital ring 308 is bounded on two sides by hub 306, and on one two sides by shaft 310. The inner diameter of orbital ring 308 includes a fluid dynamic journal bearing 360 for centering orbital ring 308 with respect to shaft 310.

Bearing fluid fills each bearing gap in the embodiment of FIG. 3. Bearing gap 340 lies between the inner radial surface of orbital ring 308 and the facing surface of shaft 310. Radial bearing gap 342 is located between the outer radial surface of orbital ring 308 and the facing surface of hub 306. Bearing gap 344 is located between the top axial surface of orbital ring 308 and the facing surface of hub 306. Bearing gap 346 is located between the bottom axial surface of orbital ring 308 and the facing surface of shaft 310.

As hub 306 rotates about rotational axis 311, the bearing fluid in bearing gaps 342 and 344 exerts sheer forces on the outer radial and top axial surfaces of orbital ring 308, respectively. The torques resulting from these sheer forces cause orbital ring 308 to rotate about rotational axis 311 in the same direction as hub 306. In addition, the bearing fluid in bearing gaps 340 and 346 exerts sheer forces on the inner radial and bottom axial surfaces of orbital ring 308, respectively. Because shaft 310 is stationary, the torques resulting from these sheer forces resist the rotation of orbital ring 308 about rotational axis 311 caused by the rotation of hub 306. Orbital ring 308 reaches a steady-state angular velocity about rotational axis 311 (in the same direction as hub 306) when the torques acting on the various surfaces of orbital ring 308 are in balance with one another. As orbital ring 308 rotates, a fluid dynamic journal bearing 360 radially supports orbital ring 308, and a fluid dynamic thrust bearing 366 axially supports orbital ring 308.

The hybrid orbital FDB motor includes traditional journal bearing 361 disposed between shaft 310 and hub 306. Journal bearing 361 is in parallel with fluid dynamic journal bearing 360 disposed between the inner diameter of orbital ring 308 and shaft 310. The two fluid dynamic thrust bearings 364 and 366 are in series. Serial fluid dynamic thrust bearings 364 and 366 act in parallel with traditional style journal bearing 361 and serial journal bearings 360 and 362.

Like other embodiments of the hybrid orbital FDB motors disclosed herein, the embodiment of FIG. 3 is a hybrid fluid dynamic bearing motor in which serial fluid dynamic thrust bearings 364 and 366 act in parallel with fluid dynamic journal bearing 361. The hybrid orbital fluid dynamic bearing motor design retains the significantly reduced power performance of motors having an orbital ring, allowing larger bearings with better stiffness, or enabling a very low power thrust bearing design. Importantly, the presence of journal bearing 361 provides higher radial and angular stiffness than was available in non-hybrid orbital ring FDB motor designs.

The hybrid orbital FDB motor embodiment in FIG. 3 also retains the benefits of orbital rings. The power consumed by a fluid dynamic bearing is a function of, among other things, the square of the relative velocity between the two thrust bearing surfaces 364 and 366. Because the motion of orbital ring 308 relative to hub 306 and shaft 310 effectively decreases the relative velocity between the bearing surfaces of fluid dynamic journal bearings 360 and 362 and fluid dynamic thrust bearings 364 and 366, orbital ring 308 substantially decreases the power consumption of hybrid orbital FDB motor assembly 300. Persons skilled in the art will understand that the configurations of fluid dynamic journal bearings 360, 361, and 362, as well as fluid dynamic thrust bearings 364 and 366 determine the angular velocity of orbital ring 308 relative to that of hub 306. Persons skilled in the art also will understand that the resulting angular velocity of orbital ring 308 is less than that of hub 306 and that different angular velocities of orbital ring 308 may be achieved by adjusting the configurations of fluid dynamic journal bearings 360 and 362 and fluid dynamic thrust bearings 364 and 366. Persons skilled in the art will therefore recognize that the angular velocity of orbital ring 308 in no way limits the scope of the invention.

For example, in one embodiment, hybrid orbital FDB motor assembly 300 is configured such that the angular velocity of orbital ring 308 is a fraction of that of hub 306. As shaft 310 is stationary, the difference in the velocities of the bearing surfaces of fluid dynamic journal bearings 360 and 362 and fluid dynamic thrust bearings 364 and 366 is a fraction of the angular velocity of hub 306. By contrast, if orbital ring 308 is not included in hybrid orbital FDB motor assembly 300, and assuming that FDB motor assembly 300 therefore includes only parallel FDB journal bearings and one fluid dynamic thrust bearing, then the difference in the velocities of the bearing surfaces of the fluid dynamic bearings is simply the angular velocity of hub 306. Because including orbital ring 308 results in a fractional sheer velocity in each of the fluid dynamic journal bearings 360 and 362, as well as fluid dynamic thrust bearings 364 and 366, consumes a fraction of the power that each of the fluid dynamic bearings consumes if orbital ring 308 is not included in hybrid orbital FDB motor assembly 300. Hybrid orbital FDB motor assembly 300 with orbital ring 308 therefore consumes substantially less power than FDB motor assembly 300 without orbital ring 308 consumes, even though FDB motor assembly 300 with orbital ring 308 includes twice the number of fluid dynamic bearings.

In alternative embodiments, each of fluid dynamic journal bearings 360, 361, and 362, as well as fluid dynamic thrust bearings 364 and 366, may have any configuration and may pump bearing fluid in any direction so long as orbital ring 308 functions as intended. Further, each such bearing may be disposed in any suitable location. Persons skilled in the art therefore will recognize that neither the configurations nor the locations of fluid dynamic journal bearings 360 and 362 or fluid dynamic thrust bearings 364 and 366 in any way limit the scope of the invention.

Again, persons skilled in the art will understand that the same general principles and concepts described above in conjunction with FIGS. 1 and 2 apply with equal force to the embodiment described above in conjunction with FIG. 3.

Figure 4:
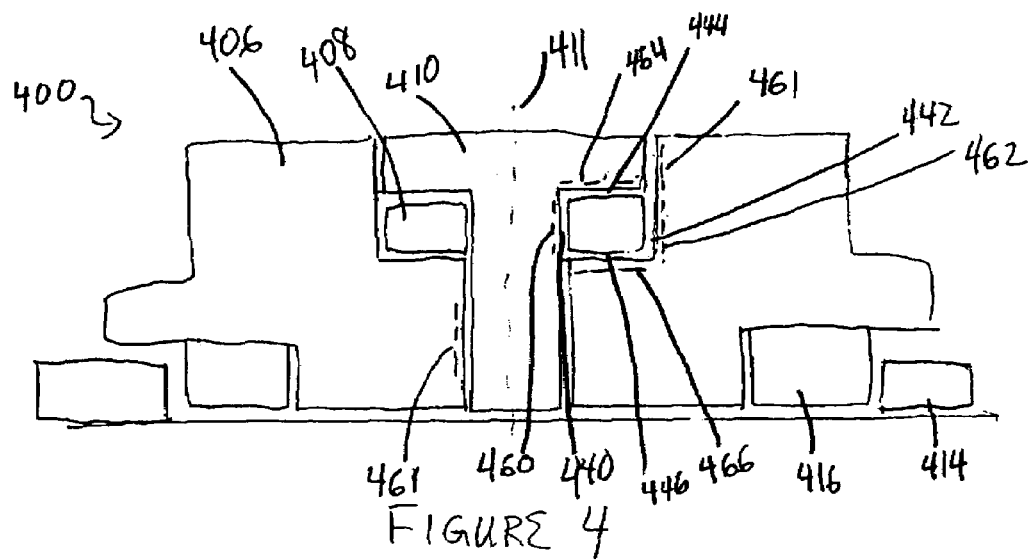
FIG. 4 depicts a cross-section of a hybrid orbital fluid dynamic bearing motor according to another embodiment.

FIG. 4 depicts a simplified cross-sectional view of another embodiment of the hybrid orbital hybrid orbital FDB motor assembly. As shown, the hybrid orbital FDB motor assembly 400 may include, without limitation, a hub 406, orbital ring 408, a shaft 410, a stator assembly 414, a magnet 416, and a base 420. The embodiment of FIG. 4 is a stationary shaft embodiment of the hybrid orbital FDB motor. Shaft 410 is attached to base 420 and supports FDB motor assembly 400. In this embodiment, shaft 410 is stationary. Specifically, magnet 416 is attached to hub 406, and the electromagnetic interaction between magnet 416 and stator assembly 414 causes hub 406 to rotate about rotational axis 411.

In addition, the hybrid orbital FDB motor includes a traditional fluid dynamic journal bearing 461 disposed between shaft 410 and hub 406. Fluid dynamic journal bearing 461 is arranged in parallel with fluid dynamic journal bearing 460 disposed between the inner diameter of orbital ring 408 and shaft 410. Fluid dynamic thrust bearing 464 is disposed between the orbital ring 408 and shaft 410. Fluid dynamic thrust bearing 466 is disposed between orbital ring 408 and hub 406. The two fluid dynamic thrust bearings 464 and 466 are in series. Serial fluid dynamic thrust bearings 464 and 466 act in parallel with radial bearing 460 and traditional style journal bearing 461.

Like other embodiments of the hybrid orbital FDB motors, the embodiment of FIG. 4 provides a hybrid orbital FDB motor in which serial fluid dynamic thrust bearings 464 and 466 act in parallel with radial bearing 460 and journal bearing 461. The hybrid design retains the significantly reduced power performance of motors having an orbital ring, allowing larger bearings to be used with better stiffness performance, or enabling a very low power thrust bearing design. The journal bearing 461 provides higher radial and angular stiffness than in previous orbital ring designs.

As will be recognized, the configuration of hybrid orbital FDB motor assembly 400 is generally similar to that of FDB motor assembly 300. One difference, however, is that the orbital ring 408 is disposed at the top of the stationary shaft 410 instead of the bottom. As a result, fluid dynamic thrust bearing 464 is disposed between the top surface of orbital ring 408 and shaft 410. Fluid dynamic thrust bearing 466 is disposed between the bottom surface of orbital ring 408 and hub 406. Again, as previously described herein, one reason for this configuration is to increase the effective stiffness supporting orbital ring 432 and sleeve 406 to compensate for the increased heights of those elements.

Persons skilled in the art will understand that the same general principles and concepts described above in conjunction with FIGS. 1-3 apply with equal force to the embodiment described above in conjunction with FIG. 4.

Figure 5A:
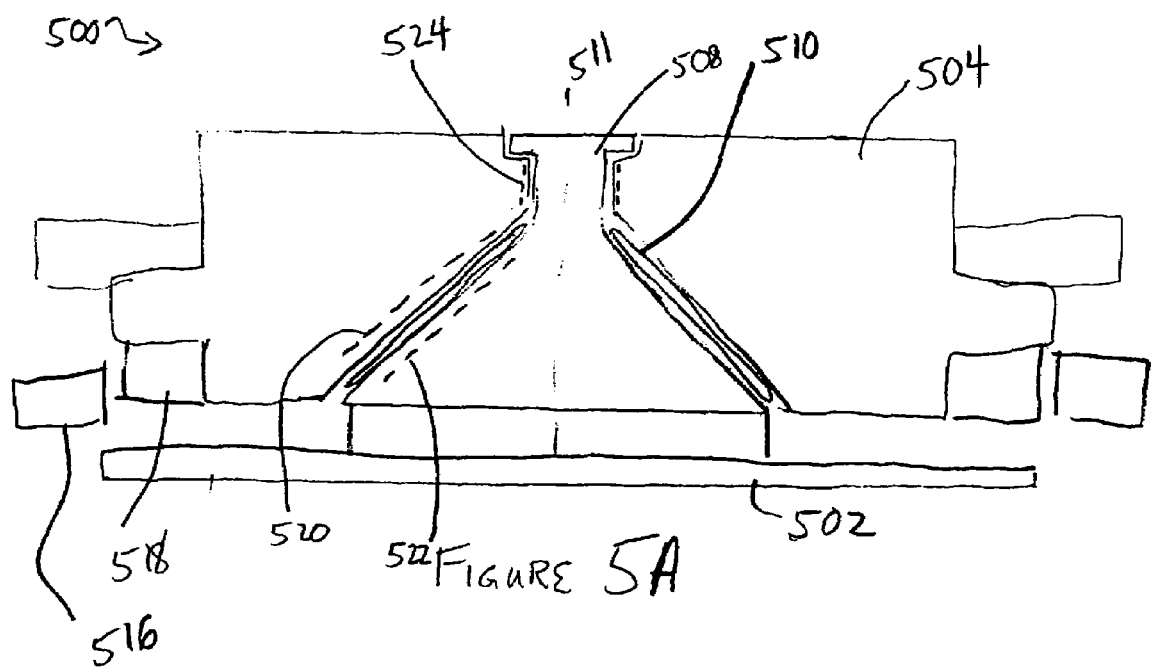
FIG. 5A depicts a cross-section of a hybrid orbital fluid dynamic bearing motor according to another embodiment.

In another embodiment, FIG. 5A is a cross-sectional view illustrating a conical orbital ring 510 in fluid dynamic bearing motor assembly 500. As shown, hybrid orbital FDB motor assembly 500 may include, without limitation, a base 502, a hub 504, a sleeve 506, a shaft 508, an orbital ring 510, a stator assembly 516, and a magnet 518.

Shaft 508 is attached to base 502 and supports hybrid orbital FDB motor assembly 500. As configured, sleeve 506 is stationary. Hub 504 is configured to rotate about a rotational axis 511. Specifically, magnet 518 is attached to hub 504, and the electromagnetic interaction between magnet 518 and stator assembly 516 causes hub 504 to rotate. In one embodiment, shaft 508 is attached to hub 504 by an interference fit or adhesive bond.

Shaft 508 is a conical shaft attached to base 502. Hub 504 is also conical, and is configured to fit over conical shaft 508. Orbital ring 510 is disposed between sleeve 506 and hub 504.

Figure 5B:
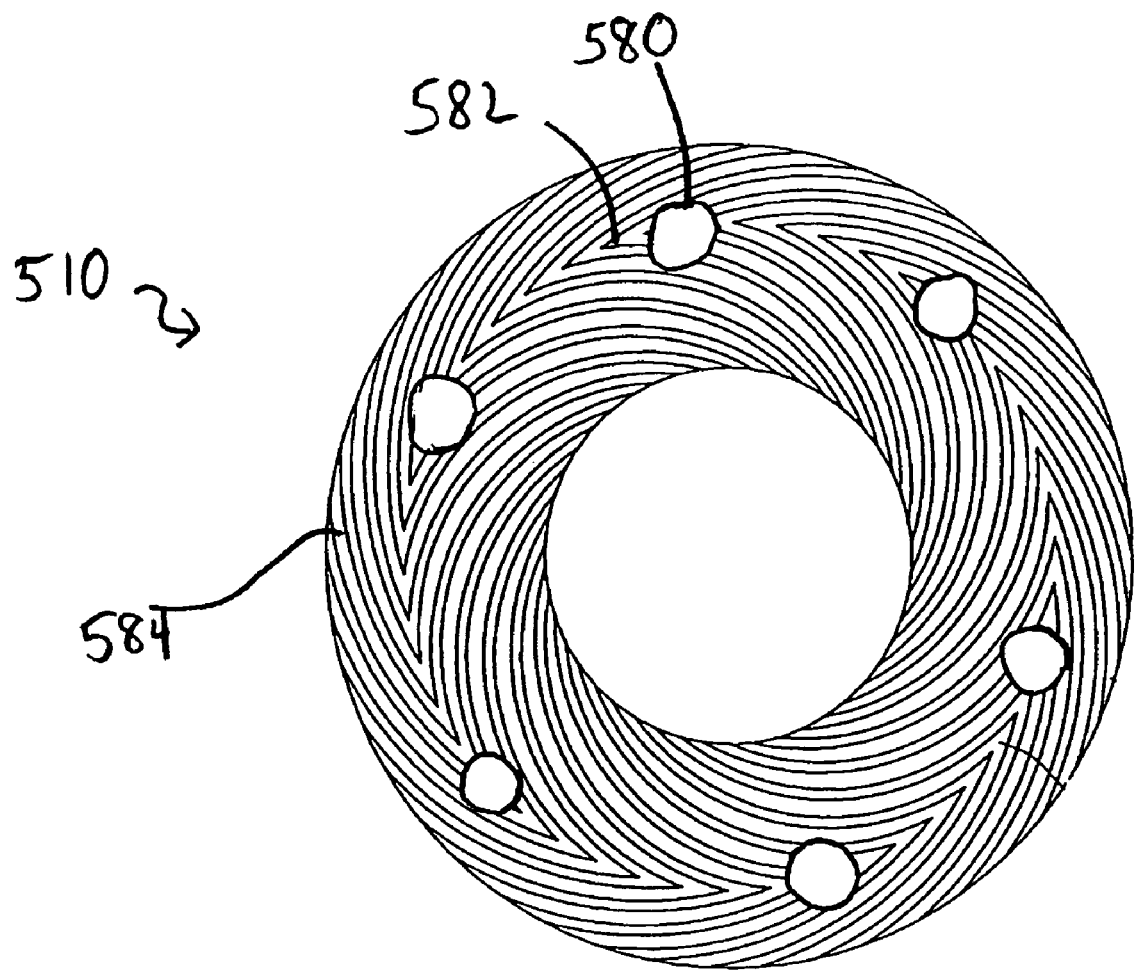
FIG. 5B depicts a top view of an orbital ring, according to one embodiment.

With further reference to FIG. 5B, orbital ring 510 is designed to have channels 580 that interact with chevron groove flow. Channels 580 can be holes. The channels 580 are aligned with the apex 582 of chevron grooves 584, and are configured to accommodate flow of fluid from one side to the other. With reference to FIG. 5A, as orbital ring 510 spins around central axis 511, fluid is pumped by chevron grooves through channels 580. Because the apex 582 of the chevron grooves 584 are aligned with the channels 580, orbital ring 510 insures that the ring rotates and the bearing gaps are established at the beginning of operation.

As configured, chevron grooves are stamped on one side of orbital ring 510. Grooved bearing surfaces may include any suitable type of grooved bearing pattern, including, without limitation, a pattern of outward spiral grooves, inward spiral grooves, or a pattern of chevron grooves as known in the art. Further, as persons skilled in the art will recognize, any of shaft 508, orbital ring 510, or hub 504 may include one or more bearing surfaces having a grooved bearing pattern. Persons skilled in the art also will understand that a fluid dynamic bearing may include one or more sets of grooves.

Like other embodiments disclosed herein, the hybrid orbital FDB motor design retains the significantly reduced power performance of motors having an orbital ring, allowing larger bearings to be used with better stiffness performance, or enabling a very low power bearing design. The angular design of orbital ring 510 additionally provides radial stiffness not present in previous hybrid orbital ring designs.

Persons skilled in the art will understand that the same general principles and concepts described above in conjunction with FIGS. 1-4 apply with equal force to the embodiment described above in conjunction with FIGS. 5A-C.

Figure 6:
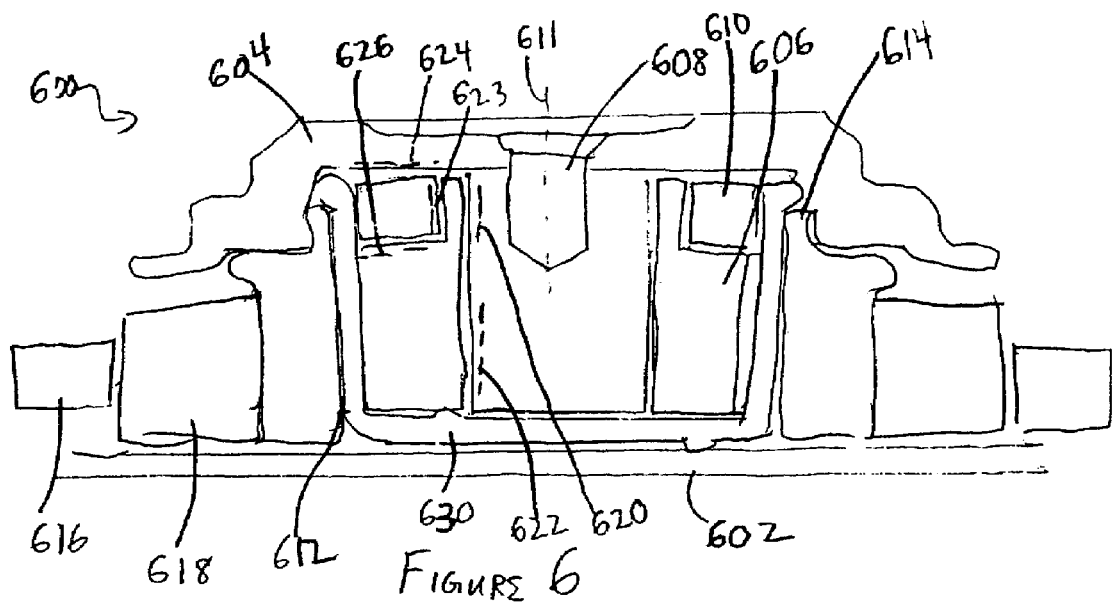
FIG. 6 depicts a cross-section of a hybrid orbital fluid dynamic bearing motor according to another embodiment.

In another embodiment, FIG. 6 is a cross-sectional view illustrating fluid dynamic bearing motor assembly 600. As shown, hybrid orbital FDB motor assembly 600 may include, without limitation, a base 602, a hub 604, a sleeve 606, a shaft 608, an orbital ring 610, a seal 612, a shock displacement limiter 614, a stator assembly 616, a magnet 618, and an encapsulating cup 630.

Sleeve 606 is attached to cup 630 and base 602 and supports hybrid orbital FDB motor assembly 600. As configured, sleeve 606 is stationary. Hub 604 is configured to rotate about a rotational axis 611. Specifically, magnet 618 is attached to hub 604, and the electromagnetic interaction between magnet 618 and stator assembly 616 causes hub 604 to rotate. Shaft 608 is attached to hub 604. In one embodiment, shaft 608 is attached to or integral with hub 604 by an interference fit or adhesive bond. As shaft 608 is attached to or integral with hub 604, shaft 608 rotates about rotational axis 611 as well.

Orbital ring 610 is disposed on the outer diameter of sleeve 606 between hub 604 and sleeve 606. Orbital ring 610 is thus bounded on two sides by hub 604 and on two sides by sleeve 606. The inner diameter of orbital ring 610 includes fluid dynamic journal bearing 623 to center orbital ring 610 with respect to sleeve 606. Because orbital ring 610 is disposed on the outer diameter of sleeve 606, it does not interfere with optimizing the location of FDB journal bearings 620 and 622.

The embodiment depicted by FIG. 6 is a hybrid orbital FDB motor. The fluid dynamic bearing motor includes two fluid dynamic thrust bearings 624 and 626 in series. Fluid dynamic thrust bearing 624 is disposed between the orbital ring 610 and the facing surface of hub 604. Fluid dynamic thrust bearing 626 is disposed between orbital ring 610 and the facing surface of sleeve 606. Fluid dynamic journal bearings 620 and 622 are arranged in parallel. Each fluid dynamic journal bearing 620 and 624 is disposed between sleeve 606 and shaft 608. The motor is a hybrid orbital FDB motor because serial fluid dynamic thrust bearings 624 and 626 act in parallel with traditional style parallel fluid dynamic journal bearings 620 and 622.

Like other embodiments disclosed herein, the hybrid orbital FDB motor design retains the significantly reduced power performance of motors having an orbital ring, allowing larger bearings to be used with better stiffness performance, or enabling a very low power thrust bearing design. The addition of parallel journal bearings provides higher radial and angular stiffness than in previous orbital ring designs.

Each grooved bearing surface may include any suitable type of grooved bearing pattern, including, without limitation, a pattern of spiral grooves or a pattern of chevron grooves. Further, as persons skilled in the art will recognize, any of orbital ring 610, sleeve 606, or hub 604 may include one or more bearing surfaces having a grooved bearing pattern. Persons skilled in the art also will understand that a fluid dynamic bearing may include one or more sets of grooves.

Each of the fluid dynamic thrust bearings 624 and 626 and fluid dynamic journal bearings 620 and 622 may have any configuration and may pump bearing fluid in any direction so long as orbital ring 610 functions as intended. Further, each such bearing may be disposed in any suitable location. Persons skilled in the art therefore will recognize that neither the configuration nor the location of radial FDB 623, fluid dynamic journal bearings 620 and 622 or fluid dynamic thrust bearings 624 and 626 in any way limits the scope of the invention.

Persons skilled in the art will understand that the same general principles and concepts described above in conjunction with FIGS. 1-5 apply with equal force to the embodiment described above in conjunction with FIG. 6.

Figure 7:
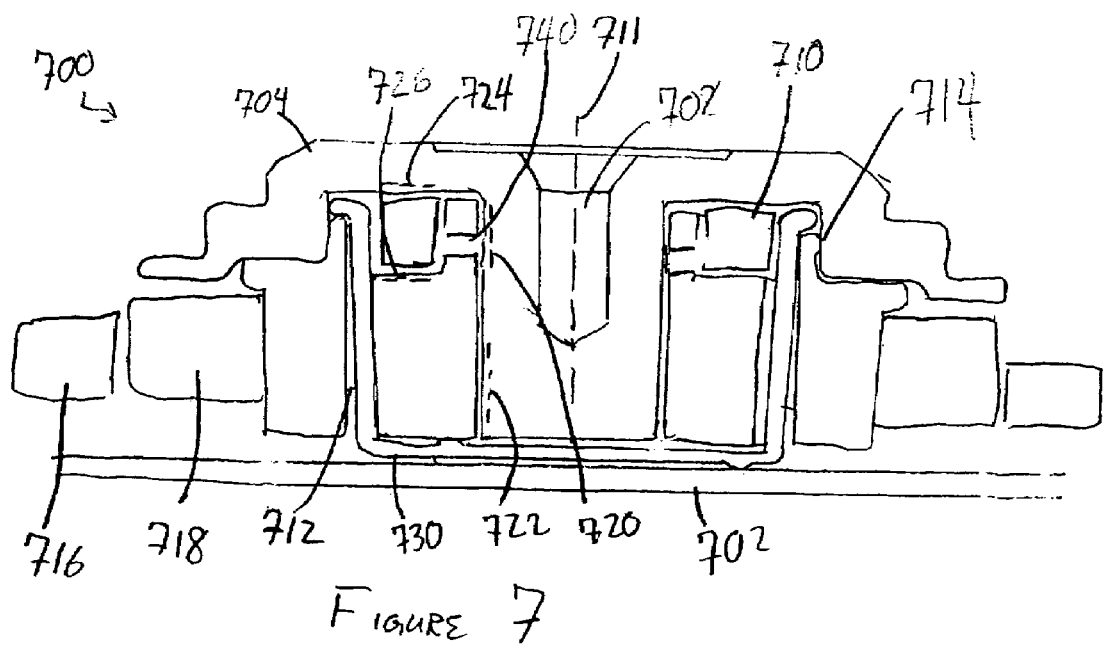
FIG. 7 depicts a cross-section of a hybrid orbital fluid dynamic bearing motor according to another embodiment.

In another embodiment, FIG. 7 is a cross-sectional view illustrating an orbital ring 710 in a fluid dynamic bearing motor assembly 700. As shown, hybrid orbital FDB motor assembly 700 may include, without limitation, a base 702, a hub 704, a sleeve 706, a shaft 708, an orbital ring 710, a seal 712, a shock displacement limiter 714, a stator assembly 716, a magnet 718, and an encapsulating cup 730.

Sleeve 706 is attached to base 702 and supports hybrid orbital FDB motor assembly 700. As configured, sleeve 706 is stationary. Hub 704 is configured to rotate about a rotational axis 711. Specifically, magnet 718 is attached to hub 704, and the electromagnetic interaction between magnet 718 and stator assembly 716 causes hub 704 to rotate. Shaft 708 is attached to hub 704. In one embodiment, shaft 708 is attached to or integral with hub 704 by an interference fit or adhesive bond. As shaft 708 is attached to hub 704, shaft 708 rotates about rotational axis 711 as well.

The embodiment depicted by FIG. 7 is a hybrid orbital FDB motor. The fluid dynamic bearing motor includes two fluid dynamic thrust bearings 724 and 726 in series. Fluid dynamic thrust bearing 724 is disposed between the orbital ring 710 and the facing surface of hub 704. Fluid dynamic thrust bearing 726 is disposed between orbital ring 710 and the facing surface of sleeve 706. The fluid dynamic bearing motor also includes two fluid dynamic journal bearings 720 and 722 arranged in parallel. Each of FDB journal bearing 720 and 724 is disposed between sleeve 706 and shaft 708. The motor is a hybrid orbital FDB motor because serial fluid dynamic thrust bearings 724 and 726 act in parallel with traditional style parallel FDB journal bearings 720 and 722.

Like other embodiments disclosed herein, the hybrid orbital FDB motor design retains the significantly reduced power performance of motors having an orbital ring, allowing larger bearings to be used with better stiffness performance, or enabling a very low power thrust bearing design. The addition of parallel journal bearings provides higher radial and angular stiffness than in previous orbital ring designs.

Like orbital ring 610 in the embodiment of FIG. 6, orbital ring 710 is disposed on the outer edge of sleeve 706 between hub 704 and sleeve 706. Orbital ring 710 is thus bounded on two sides by hub 704 and on two sides by sleeve 706. Because orbital ring 710 is disposed on the outer diameter of sleeve 706, it does not interfere with optimizing the location fluid dynamic journal bearings 720 and 722.

Unlike orbital ring 610 in the embodiment of FIG. 6, one or more horizontal channels 740 are disposed in the sleeve 706 between shaft 708 and orbital ring 710. During operation, fluid from upper journal bearing 720 pumps through horizontal channels 740, and applies pressure to orbital ring 710. The fluid flow provides a radial centering force for orbital ring 710.

Each grooved bearing surface may include any suitable type of grooved bearing pattern, including, without limitation, a pattern of spiral grooves or a pattern of chevron grooves. Further, as persons skilled in the art will recognize, any of orbital ring 710, sleeve 706, or hub 704 may include one or more bearing surfaces having a grooved bearing pattern. Persons skilled in the art also will understand that a fluid dynamic bearing may include one or more sets of grooves.

Each of the fluid dynamic thrust bearings 724 and 726 and fluid dynamic journal bearings 720 and 722 may have any configuration and may pump bearing fluid in any direction so long as orbital ring 710 functions as intended. Further, each such bearing may be disposed in any suitable location. Persons skilled in the art therefore will recognize that neither the configuration nor location of radial FDB 723, fluid dynamic journal bearings 720 and 722 or fluid dynamic thrust bearings 724 and 726 in any way limits the scope of the invention.

Persons skilled in the art will understand that the same general principles and concepts described above in conjunction with FIGS. 1-6 apply with equal force to the embodiment described above in conjunction with FIG. 7.

The embodiments described herein can be designed such that the orbital ring remains centered. Certain embodiments disclosed above include centering mechanisms for orbital rings. Additional centering mechanisms are disclosed as follows. It is understood that any centering mechanism disclosed herein can be used in conjunction with any hybrid orbital FDB motor.

Figure 8:
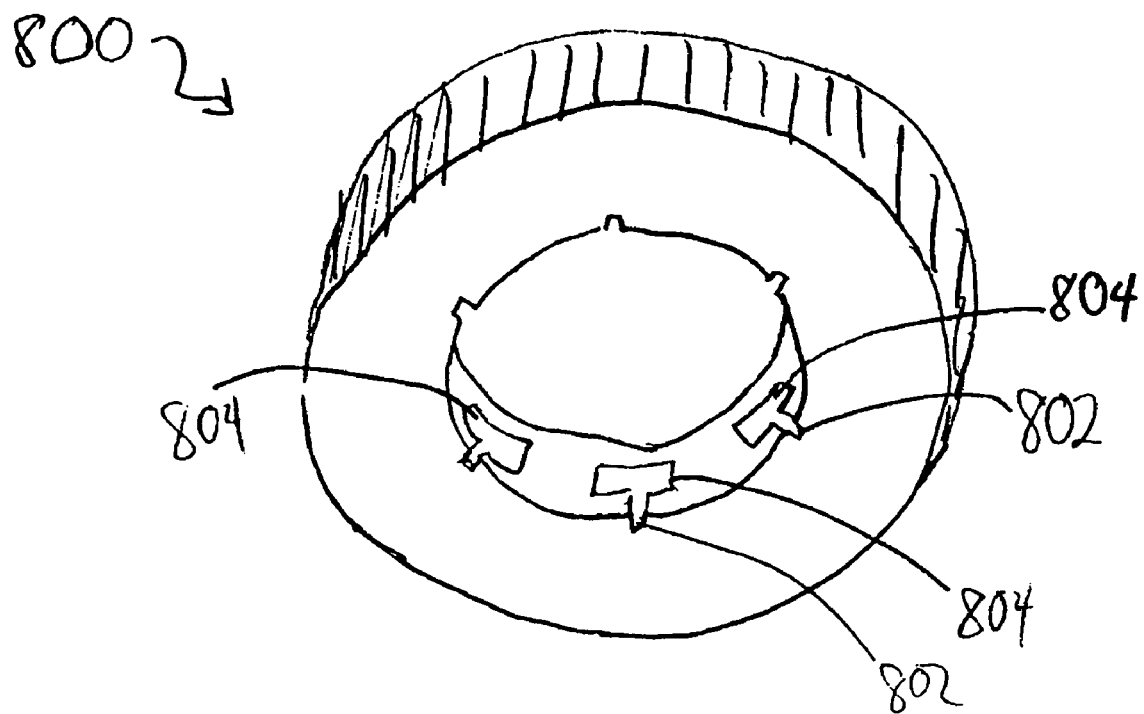
FIG. 8 depicts a perspective view of an orbital ring, according to another embodiment.

In another embodiment, the orbital ring is configured with depressions in its inner diameter that allow for static self-centering. One embodiment of a static self-centering ring is depicted in FIG. 8. Orbital ring 800 has a series of evenly distributed entry channels 802 each linked to rectangular depressions 804. In fluid dynamic bearing motors, fluid flows into the entry channels 802. The fluid is distributed evenly around each rectangular depression 804. The flow out of rectangular depressions 804 in orbital ring 800 thereby creates a static pressure force against an adjoining shaft. Orbital ring 800 can be substituted, without limitation, for any orbital ring disclosed herein, such as orbital ring 210 in FIG. 2 or orbital ring 610 in FIG. 6.

Figure 9:
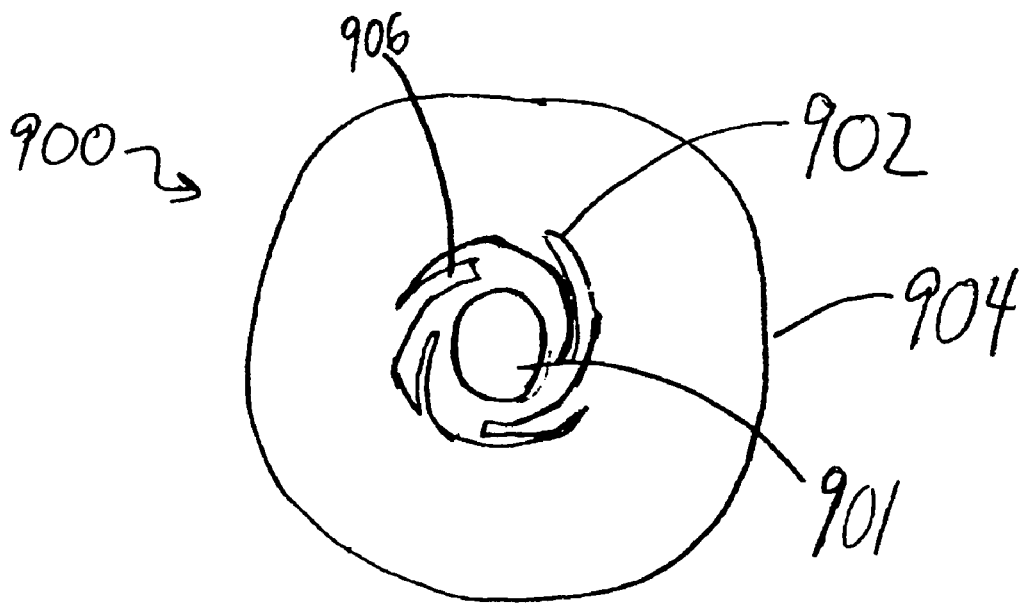
FIG. 9 depicts a top view of an orbital ring, according to another embodiment.

FIG. 9 depicts a top view of another embodiment of an orbital ring. Orbital ring 900 has an inner diameter 902 and outer diameter 904 disposed around shaft 901. Three fingers 906 extend from the inner diameter 902 of orbital ring 900. Orbital ring 900 is further configured to have a series of channels 908 distributed radially around the surface of orbital ring 900. During operation, orbital ring 900 rotates around shaft 901. The force of the fluid around finger 906 centers orbital ring 900 around shaft 901.

It will be readily apparent to those skilled in the art that any number of fingers may be arranged around the inner diameter, and any number of channels may be radially dispersed around the orbital ring 900. Further, orbital ring 900 may be substituted as an orbital ring in any other embodiment disclosed herein.

Figure 10:
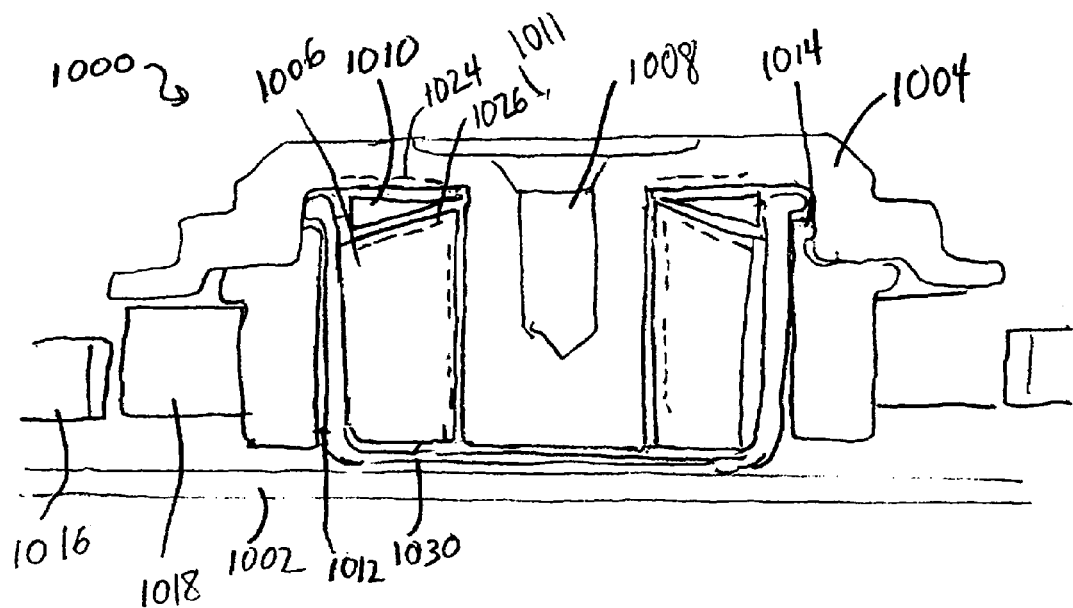
FIG. 10 depicts a cross-section of a hybrid orbital fluid dynamic bearing motor according to another embodiment.

In another embodiment, FIG. 10 is a cross-sectional view illustrating an orbital ring 1010 in a fluid dynamic bearing motor assembly 1000. As shown, hybrid orbital FDB motor assembly 1000 may include, without limitation, a base 1002, a hub 1004, a sleeve 1006, a shaft 1008, an orbital ring 1010, a seal 1012, a shock displacement limiter 1014, a stator assembly 1016, a magnet 1018, and an encapsulating cup 1030.

Sleeve 1006 is attached to base 1002 and supports hybrid orbital FDB motor assembly 1000. As configured, sleeve 1006 is stationary. Hub 1004 is configured to rotate about a rotational axis 1011. Specifically, magnet 1018 is attached to hub 1004, and the electromagnetic interaction between magnet 1018 and stator assembly 1016 causes hub 1004 to rotate. Shaft 1008 is attached to hub 1004. In one embodiment, shaft 1008 is attached to or integral with hub 1004 by an interference fit or adhesive bond. As shaft 1008 is attached to hub 1004, shaft 1008 rotates about rotational axis 1011 as well.

The lower surface of orbital ring 1010 is tapered with respect to its upper surface. The bottom surface of orbital ring 1010 is at an angle with respect to the top surface. When orbital ring 1010 drifts off central axis 1011, the gap between orbital ring 1010 and sleeve 1006 closes in the radial and axial directions. Closing the gap produces a radial reaction force, which recenters the ring. Tapering of orbital ring 1010 thereby induces a radial self-centering force.

Persons skilled in the art will understand that the same general principles and concepts described above in conjunction with FIGS. 1-9 apply with equal force to the embodiment described above in conjunction with FIG. 10.

Figure 11:
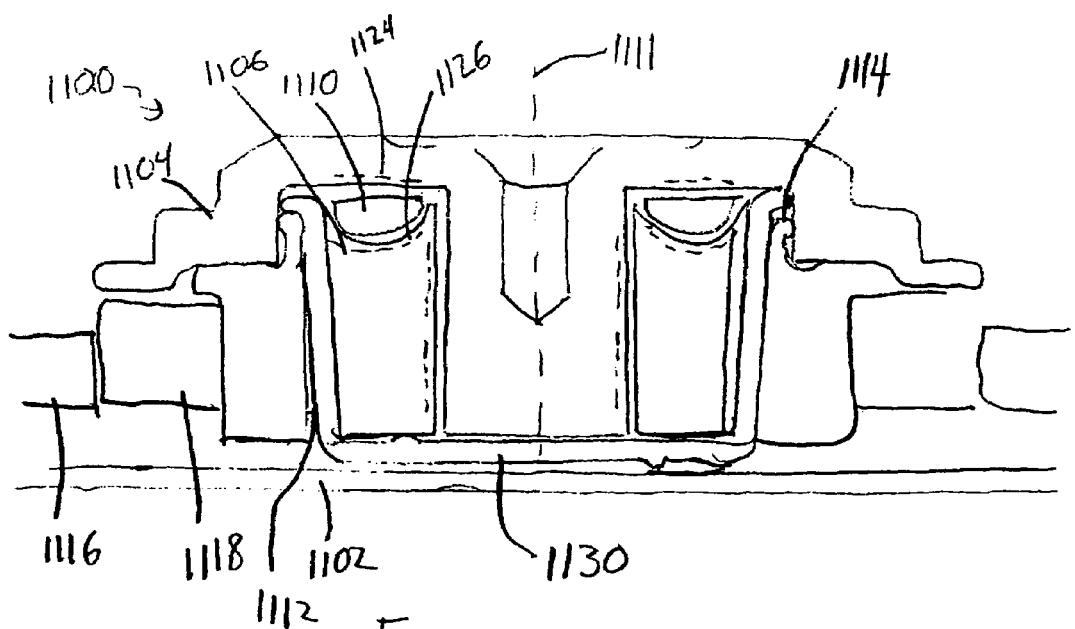
FIG. 11 depicts a cross-section of a hybrid orbital fluid dynamic bearing motor according to another embodiment.

In another embodiment, FIG. 11 is a cross-sectional view illustrating an orbital ring 1110 in a fluid dynamic bearing motor assembly 1100. As shown, hybrid orbital FDB motor assembly 1100 may include, without limitation, a base 1102, a hub 1104, a sleeve 1106, a shaft 1108, an orbital ring 1110, a stator assembly 1116, and a magnet 1118.

Sleeve 1106 is attached to base 1102 and supports hybrid orbital FDB motor assembly 1100. As configured, sleeve 1106 is stationary. Hub 1104 is configured to rotate about a rotational axis 1111. Specifically, magnet 1118 is attached to hub 1104, and the electromagnetic interaction between magnet 1118 and stator assembly 1116 causes hub 1104 to rotate. Shaft 1108 is attached to hub 1104. In one embodiment, shaft 1108 is attached to or integral with hub 1104 by an interference fit or adhesive bond. As shaft 1108 is attached to hub 1104, shaft 1108 rotates about rotational axis 1111 as well.

The top of orbital ring 1110 that abuts hub 1104 is flat, while the bottom of orbital ring 1110 that abuts sleeve 1106 is hemispherical. Bearing gap 1146 of sleeve 1106 is hemispherical, and configured to fit orbital ring 1110. When orbital ring 1110 drifts off central axis 1111, a gap between the inner diameter of orbital ring 1110 and sleeve 1106 and the outer diameter of orbital ring 1110 and sleeve 1106 closes in the radial direction. Closing the gap produces a radial reaction force which recenters the ring. Providing orbital ring 1110 having a hemispherical interface with sleeve 1106 induces a radial self-centering force.

Those of skill in the art will recognize that the top of orbital ring 1110 may be hemispherical, and the bottom of orbital ring that abuts sleeve 1106 may be flat.

Persons skilled in the art will understand that the same general principles and concepts described above in conjunction with FIGS. 1-10 apply with equal force to the embodiment described above in conjunction with FIG. 11.

Figure 12:
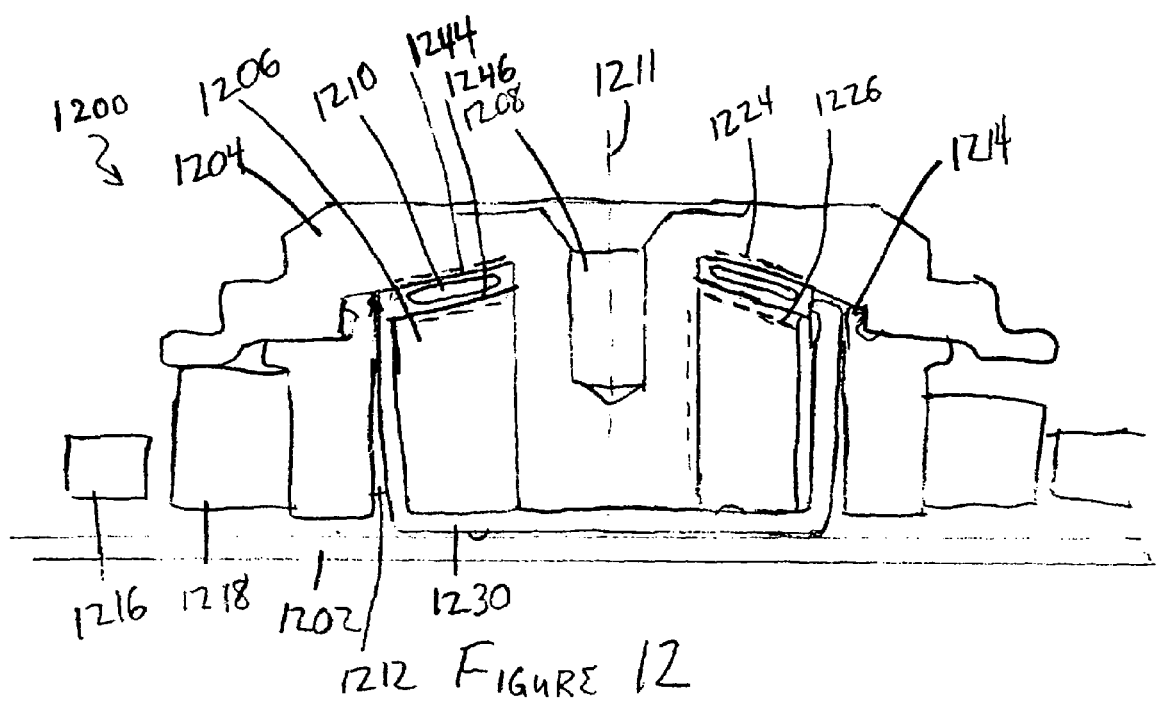
FIG. 12 depicts a cross-section of a hybrid orbital fluid dynamic bearing motor according to another embodiment.

In another embodiment, FIG. 12 is a cross-sectional view illustrating an orbital ring 1210 in a fluid dynamic bearing motor assembly 1200. As shown, hybrid orbital FDB motor assembly 1200 may include, without limitation, a base 1202, a hub 1204, a sleeve 1206, a shaft 1208, an orbital ring 1210, a stator assembly 1216, and a magnet 1218.

Sleeve 1206 is attached to base 1202 and supports hybrid orbital FDB motor assembly 1200. As configured, sleeve 1206 is stationary. Hub 1204 is configured to rotate about a rotational axis 1211. Specifically, magnet 1218 is attached to hub 1204, and the electromagnetic interaction between magnet 1218 and stator assembly 1216 causes hub 1204 to rotate. Shaft 1208 is attached to hub 1204. In one embodiment, shaft 1208 is attached to or integral with hub 1204 by an interference fit or adhesive bond. As shaft 1208 is attached to hub 1204, shaft 1208 rotates about rotational axis 1211 as well.

FIG. 12 shows a self-centering orbital ring configuration in which orbital ring 1210 is interposed between thrust surface 1244 of hub 1204 and thrust surface 1246 of sleeve 1206. Thrust surface 1244 of hub 1204 and thrust surface 1246 of sleeve 1206 slope downward from the inner diameter to the outer diameter of orbital ring 1210. As hub 1204 rotates and orbital ring 1210 moves off axis, the gap between orbital ring 1210 and both hub 1204 and sleeve 1206 closes. Closing these gaps produces a radial reaction force which re-centers orbital ring 1210.

Persons skilled in the art will understand that the same general principles and concepts described above in conjunction with FIGS. 1-11 apply with equal force to the embodiment described above in conjunction with FIG. 12.

The orbital ring may also be centered on the motor axis by designing the orbital ring, sleeve, or hub such that the ring is in its lowest energy state when centered on the motor axis.

Figure 13:
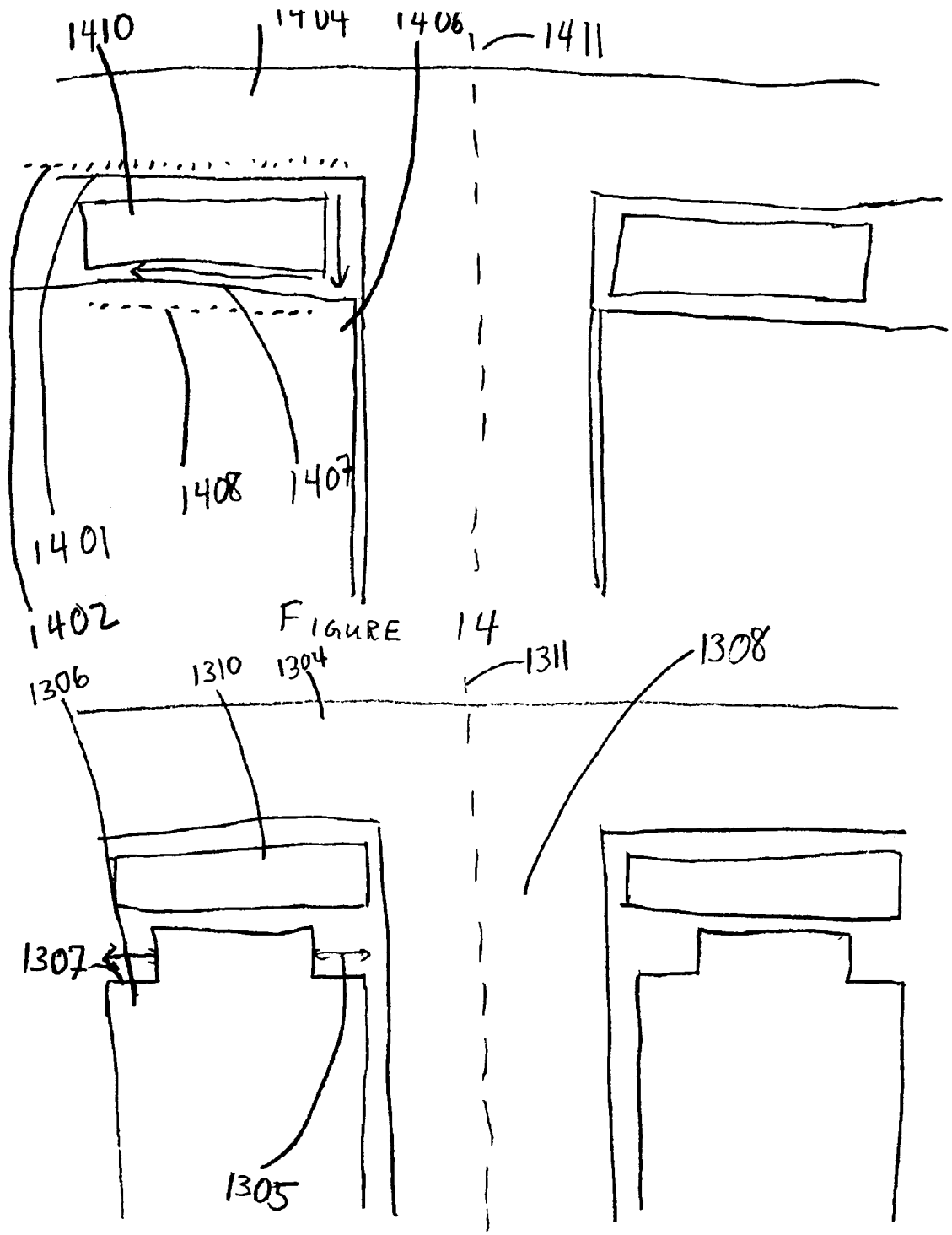
FIG. 13 depicts a cross-section of a hybrid orbital fluid dynamic bearing motor according to another embodiment.

In another embodiment, FIG. 13 depicts an example of an orbital fluid dynamic bearing motor in which orbital ring 1310 has its lowest energy state when centered on axis 1311. The radial length of the top of sleeve 1306 facing ring 1310 is shorter than the surface of hub 1304 facing the 1310. Specifically, the outer surface 1307 and inner surface 1305 of sleeve 1306 is stepped. The thrust gap is thus narrower in the center of orbital ring 1310 than at the inner or outer diameter of ring 1310. The lowest energy state of orbital ring 1310 is when the ring is centered around motor axis 1311. If orbital ring 1310 drifts off central axis 1311, fluid is locally pumped through the gap between ring 1310 and shaft 1308, centering orbital ring 1310 and returning it to its lowest energy state. It will be recognized that the embodiment disclosed in FIG. 13 be used in combination with any fluid dynamic bearing motor or portion thereof disclosed herein.

In another embodiment, FIG. 14 depicts an example of a fluid dynamic motor in which orbital ring 1410 has its lowest energy state when centered on axis 1411. Orbital ring 1410 is disposed between hub 1404 and sleeve 1406. Fluid dynamic thrust bearing 1401 is disposed between orbital ring 1410 and hub 1404, and is defined by grooves 1402 disposed on hub 1404. Fluid dynamic thrust bearing 1407 is disposed between orbital ring 1410 and sleeve 1406, and is defined by grooves 1408. The lengths of the respective grooves 1402 and 1408 are asymmetrical. Specifically, grooves 1402 are longer than grooves 1408. Grooves 1402 direct bearing fluid down the inner diameter of orbital ring 1410, and along bearing 1407 toward the outer diameter of orbital ring 1410. When orbital ring 1410 drifts off-axis, the asymmetry of bearing 1401 with respect to bearing 1407 forces orbital ring 1410 back to center axis 1411. It will be recognized that the embodiment disclosed in FIG. 14 be used in combination with any fluid dynamic bearing motor or portion thereof disclosed herein.

In sum, the above discloses several embodiments of a hybrid orbital FDB motor assembly configured with an orbital ring. As depicted, the hybrid orbital FDB motor assembly has an inner member or shaft that is configured either to remain stationary or to rotate and has an outer member that is configured to either to remain stationary or rotate. In some embodiments, the outer member is a sleeve and, in other embodiments, the outer member is a hub. The orbital ring is disposed between the inner and outer members and is configured to rotate at an angular velocity that is less than the angular velocity of the hub.

The FDB motor assembly is a hybrid orbital FDB motor. The hybrid orbital FDB motor is configured with fluid dynamic thrust bearings in series between the top surface of the orbital ring and the outer member, and bottom surface of the orbital ring and the inner member. In addition, this includes at least one traditional journal bearing between the inner member and outer member that is in parallel, and not in series, with the fluid dynamic thrust bearings. The hybrid orbital FDB motor design retains the significantly reduced power performance of motors having an orbital ring, allowing larger bearings to be used with better stiffness performance, or enabling a very low power thrust bearing design. The addition of parallel journal bearings provides higher radial and angular stiffness than in orbital ring designs without the parallel journal bearings.

The hybrid orbital FDB motor has been described above with reference to specific embodiments. Persons skilled-in the art, however, will understand that various modifications and changes may be made thereto without departing from the broader spirit and scope of the invention as set forth in the appended claims.

Further, any embodiment of the FDB motor assembly may be included in any type of electronic device that may use a precision motor. Such electronic devices include, without limitation, any type of magnetic disc drive or optical disc drive or any type of optical disc player such as a compact disc player or a digital versatile disc ("DVD") player.

The fluid dynamic bearing assembly disclosed herein has been described in the context of various embodiments of a FDB motor assembly. The fluid dynamic bearing assembly, however, may be embodied in any other system or apparatus. For example, a pair of cartridges, each including an inner race on the inner member, an outer race on the outer member and an orbital ring with fluid between a groove section and each of the inner and outer races, could be used to support a shaft and a sleeve for relative rotation, replacing a pair of ball bearings as previously used. The cartridges would be spaced along the shaft and would be preloaded to provide the requisite axial and radial support.

All publications, patents, and patent applications cited herein are hereby incorporated by reference in their entirety for all purposes to the same extent as if each individual publication, patent, or patent application were specifically and individually indicated to be so incorporated by reference. Although the foregoing embodiments have been described in some detail by way of illustration and example for purposes of clarity of understanding, it is readily apparent to those of ordinary skill in the art in light of the teachings of this application that certain changes and modifications may be made thereto.

We claim:

1. A hybrid orbital fluid dynamic bearing motor assembly, the assembly comprising:
   an inner member;
   an outer member configured to rotate about a rotational axis at a first angular velocity; and
   an orbital ring disposed between the inner member and the outer member, the orbital ring configured to rotate about the rotational axis at a second angular velocity, the second angular velocity being less than the first angular velocity;
   a first fluid dynamic thrust bearing disposed between the orbital ring and the inner member;
   a second fluid dynamic thrust bearing disposed between the orbital ring and the outer member; and
   at least one fluid dynamic journal bearing disposed between the inner member and the outer member, wherein the thrust bearings act in parallel with the journal bearing.

2. The fluid dynamic bearing motor of claim 1, wherein the inner member is a sleeve and the outer member is a hub.

3. The fluid dynamic bearing motor of claim 1, wherein the inner member comprises a recirculation channel to accommodate bearing fluid flow induced by the thrust bearings and journal bearing.

4. The fluid dynamic bearing motor of claim 1, wherein the orbital ring comprises a thin ring.

5. The fluid dynamic bearing motor of claim 1, further comprising an additional fluid dynamic journal bearing between the inner diameter of the orbital ring and the facing member.

6. An orbital fluid dynamic bearing motor assembly, the assembly comprising:
- an inner member;
- an outer member configured to rotate about a rotational axis at a first angular velocity; and
- an orbital ring disposed between the inner member and the outer member, the orbital ring configured to rotate about the rotational axis at a second angular velocity, the second angular velocity being less than the first angular velocity;
- the orbital ring configured in conjunction with the inner member and outer member to realign around the rotational axis of the assembly.

7. The orbital fluid dynamic bearing motor assembly of claim 6, wherein the orbital ring has channels configured for the passage of bearing fluid from a first side of the orbital ring to a second side of the orbital ring.

8. The orbital fluid dynamic bearing motor assembly of claim 6, wherein a plurality of chevron grooves are disposed on the orbital ring, and each said channel is disposed at the apex of a chevron groove.

9. The orbital fluid dynamic bearing motor assembly of claim 6, wherein the inner diameter of the orbital ring includes channels configured such that passage of bearing fluid through the channels creates static pressure at the facing gap that acts to center the ring.

10. The orbit fluid dynamic bearing motor assembly of claim 6,
- wherein a first fluid dynamic thrust bearing is disposed between the outer member and the orbit ring and a second fluid dynamic thrust bearing is disposed between the outer member and the orbit ring,
- wherein the first fluid dynamic thrust bearing is longer than second fluid dynamic thrust bearing.

11. The orbital fluid dynamic motor bearing of claim 10, wherein chevron grooves are disposed on the orbital ring, wherein the chevron grooves are deepest at the apex of the groove.

* * * * *